US012638554B2

(12) United States Patent
Kong et al.

(10) Patent No.: US 12,638,554 B2
(45) Date of Patent: May 26, 2026

(54) METHOD AND APPARATUS FOR IDENTIFYING DATA POINT, AND COMPUTER-READABLE STORAGE MEDIUM

(71) Applicant: BEIJING JINGDONG QIANSHI TECHNOLOGY CO., LTD., Beijing (CN)

(72) Inventors: Qi Kong, Beijing (CN); Xinyu Xu, Beijing (CN)

(73) Assignee: BEIJING JINGDONG QIANSHI TECHNOLOGY CO., LTD., Beijing (CN)

(*) Notice: Subject to any disclaimer, the term of this patent is extended or adjusted under 35 U.S.C. 154(b) by 708 days.

(21) Appl. No.: 18/004,414

(22) PCT Filed: Jun. 25, 2021

(86) PCT No.: PCT/CN2021/102311
§ 371 (c)(1),
(2) Date: Jan. 5, 2023

(87) PCT Pub. No.: WO2022/022186
PCT Pub. Date: Feb. 3, 2022

(65) Prior Publication Data
US 2023/0314568 A1 Oct. 5, 2023

(30) Foreign Application Priority Data
Jul. 31, 2020 (CN) .......................... 202010763397.5

(51) Int. Cl.
G01S 7/48 (2006.01)
G01S 17/89 (2020.01)
G01S 17/931 (2020.01)

(52) U.S. Cl.
CPC ............ *G01S 7/4808* (2013.01); *G01S 17/89* (2013.01); *G01S 17/931* (2020.01)

(58) Field of Classification Search
CPC ........ G01S 17/50; G01S 17/89; G01S 17/931; G01S 7/4808; G06V 20/58
See application file for complete search history.

(56) References Cited

U.S. PATENT DOCUMENTS 10,134,135 B1 * 11/2018 Zhang .................... G05D 1/102
10,866,101 B2 * 12/2020 Wang ................ G01C 21/1652
(Continued)

FOREIGN PATENT DOCUMENTS

CN 108664841 A 10/2018
CN 109509260 A 3/2019
(Continued)

OTHER PUBLICATIONS

Terai, JP 2004090823—English Translation (Year: 2004).*
(Continued)

*Primary Examiner* — Michael J Dalbo
(74) *Attorney, Agent, or Firm* — Myers Bigel, P.A.

(57) ABSTRACT

The present disclosure provides a method and an apparatus for identifying a data point, and a computer readable storage medium, and relates to the field of computer technologies. The method for identifying a data point includes acquiring real-time point cloud data of a current position of a vehicle;
(Continued)

converting a coordinate of a data point in the real-time point cloud data into a first coordinate under a coordinate system of a preset reference point cloud map, wherein the reference point cloud map includes static data points; matching the first coordinate of the data point in the real-time point cloud data with the reference point cloud map; and determining the data point in the real-time point cloud data as a static data point under a condition that the first coordinate of the data point in the real-time point cloud data matches the reference point cloud map.

11 Claims, 8 Drawing Sheets

(56) References Cited

U.S. PATENT DOCUMENTS

| | | | | |
|---|---|---|---|---|
| 11,668,830 | B1 * | 6/2023 | Nehmadi | G01S 17/10 |
| | | | | 356/5.01 |
| 2014/0309841 | A1 * | 10/2014 | Hara | G01S 17/89 |
| | | | | 701/26 |
| 2016/0070981 | A1 | 3/2016 | Sasaki et al. | |
| 2016/0321838 | A1 * | 11/2016 | Barone | G06T 5/50 |
| 2018/0232947 | A1 | 8/2018 | Nehmadi et al. | |
| 2019/0080183 | A1 | 3/2019 | Li et al. | |
| 2020/0250452 | A1 * | 8/2020 | Uemori | G06V 10/60 |
| 2023/0243666 | A1 * | 8/2023 | Geiger | G01C 21/20 |
| | | | | 701/400 |

FOREIGN PATENT DOCUMENTS

| | | |
|---|---|---|
| CN | 110991526 A | 4/2020 |
| CN | 111079801 A | 4/2020 |
| CN | 111339996 A | 6/2020 |
| CN | 112861595 A | 5/2021 |

OTHER PUBLICATIONS

"Communication pursuant to Rule 164(1) EPC with Supplementary Partial European Search Report", EP Application No. 21850502.2, May 24, 2024, 22 pp.

"First Office Action and English language translation", CN Application No. 202010763397.5, Aug. 17, 2021, 20 pp.

"International Search Report and Written Opinion of the International Searching Authority (with English language translation of ISR)", International Application No. PCT/CN2021/102311, Sep. 27, 2021, 11 pp.

"Second Office Action and English language translation", CN Application No. 202010763397.5, Oct. 26, 2021, 19 pp.

Peixuo , et al., "Spatial Database Index Technology", Honghian Traffic University Press, Apr. 2006, 5 pages with English language translation of p. 85.

"Communication with Supplementary European Search Report", EP Application No. 21850502.2, Nov. 4, 2024, 16 pp.

Pomerleau, Francois , et al., "Long-term 3D map maintenance in dynamic environments", 2014 IEEE International Conference on Robotics & Automation (ICRA), Hong Kong Convention and Exhibition Center, Hong Kong, China, May 31, 2014, pp. 3712-3719.

* cited by examiner

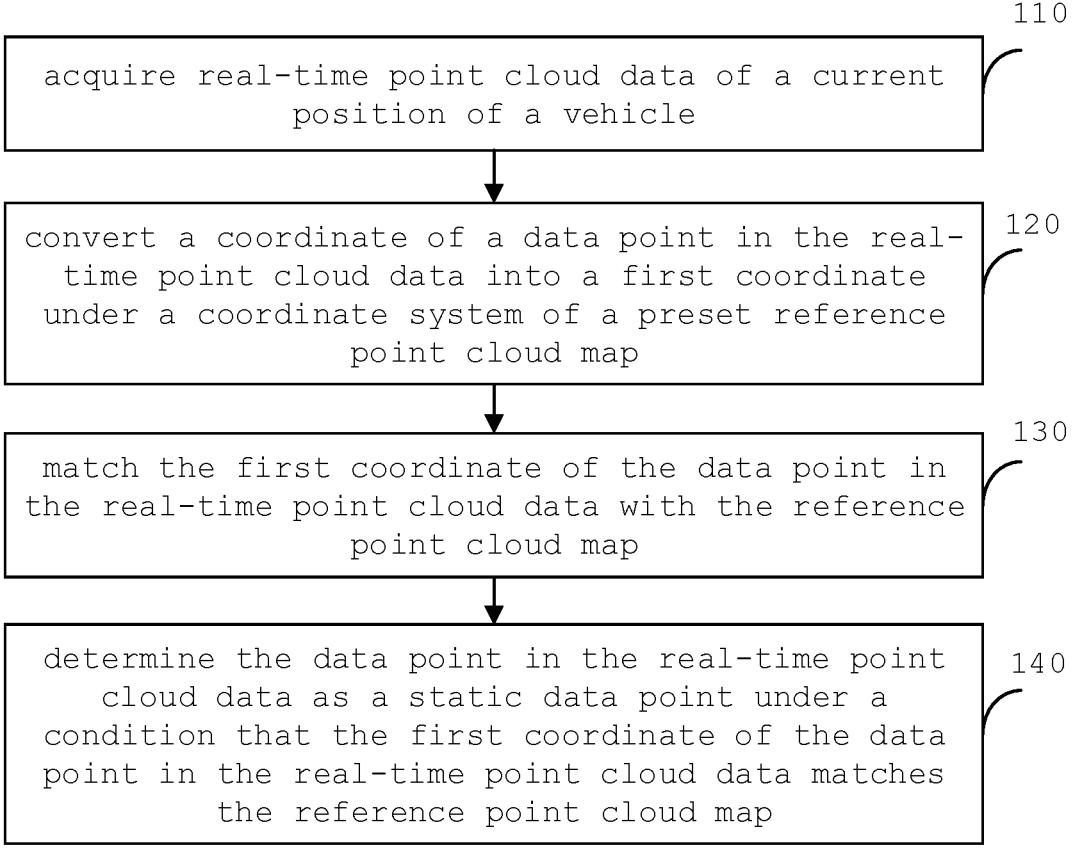

| 110 |
|---|
| acquire real-time point cloud data of a current position of a vehicle |

| 120 |
|---|
| convert a coordinate of a data point in the real-time point cloud data into a first coordinate under a coordinate system of a preset reference point cloud map |

| 130 |
|---|
| match the first coordinate of the data point in the real-time point cloud data with the reference point cloud map |

| 140 |
|---|
| determine the data point in the real-time point cloud data as a static data point under a condition that the first coordinate of the data point in the real-time point cloud data matches the reference point cloud map |

FIG. 1

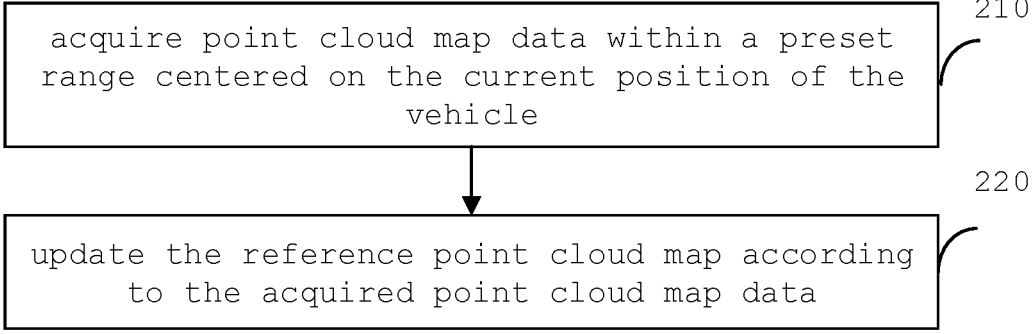

| 210 |
|---|
| acquire point cloud map data within a preset range centered on the current position of the vehicle |

| 220 |
|---|
| update the reference point cloud map according to the acquired point cloud map data |

FIG. 2

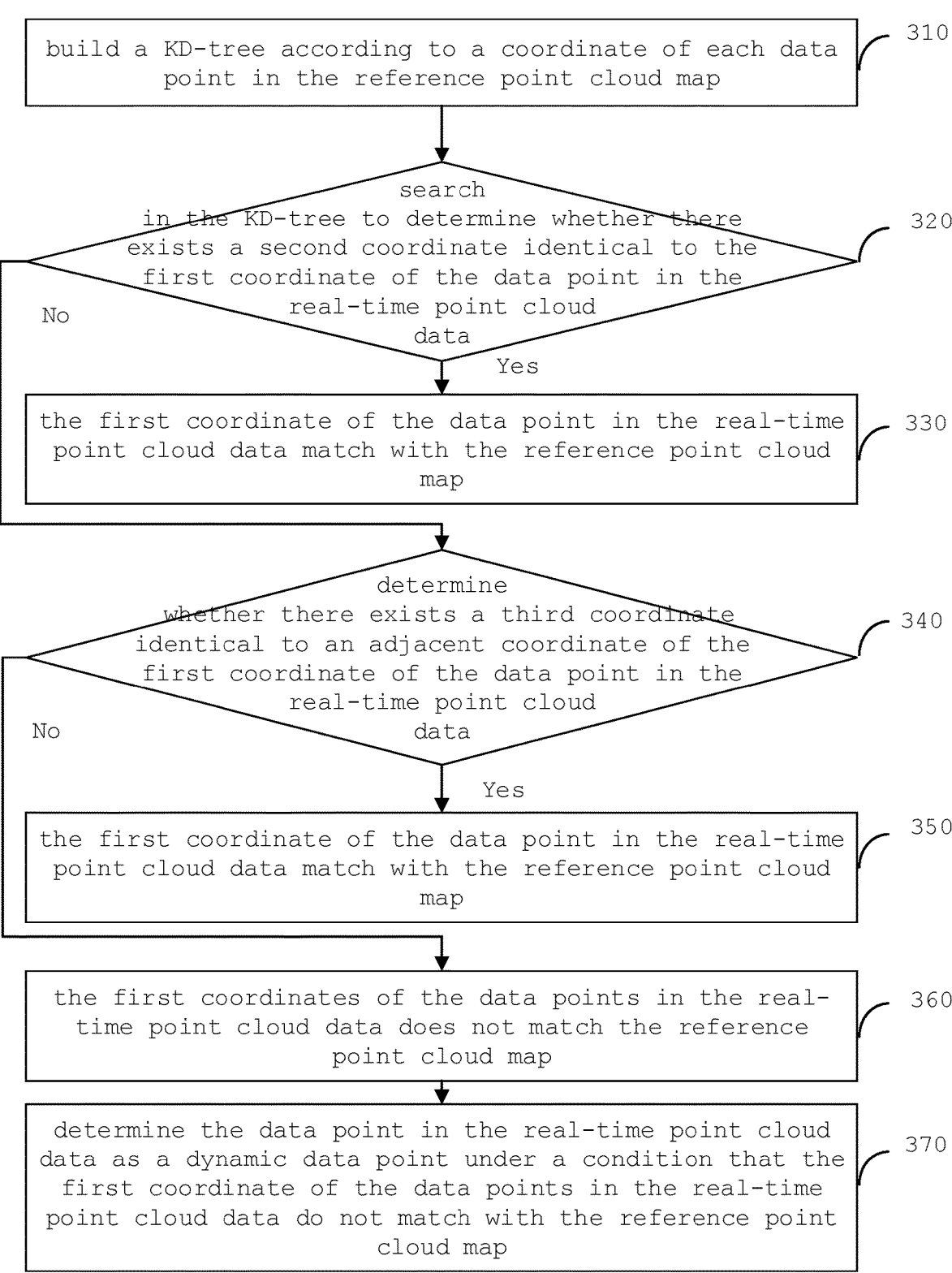

build a KD-tree according to a coordinate of each data
point in the reference point cloud map    310 search
in the KD-tree to determine whether there
exists a second coordinate identical to the
first coordinate of the data point in the
real-time point cloud
data    320

No

Yes the first coordinate of the data point in the real-time
point cloud data match with the reference point cloud
map    330 determine
whether there exists a third coordinate
identical to an adjacent coordinate of the
first coordinate of the data point in the
real-time point cloud
data    340

No

Yes the first coordinate of the data point in the real-time
point cloud data match with the reference point cloud
map    350 the first coordinates of the data points in the real-
time point cloud data does not match the reference
point cloud map    360 determine the data point in the real-time point cloud
data as a dynamic data point under a condition that the
first coordinate of the data points in the real-time
point cloud data do not match with the reference point
cloud map    370

FIG. 3

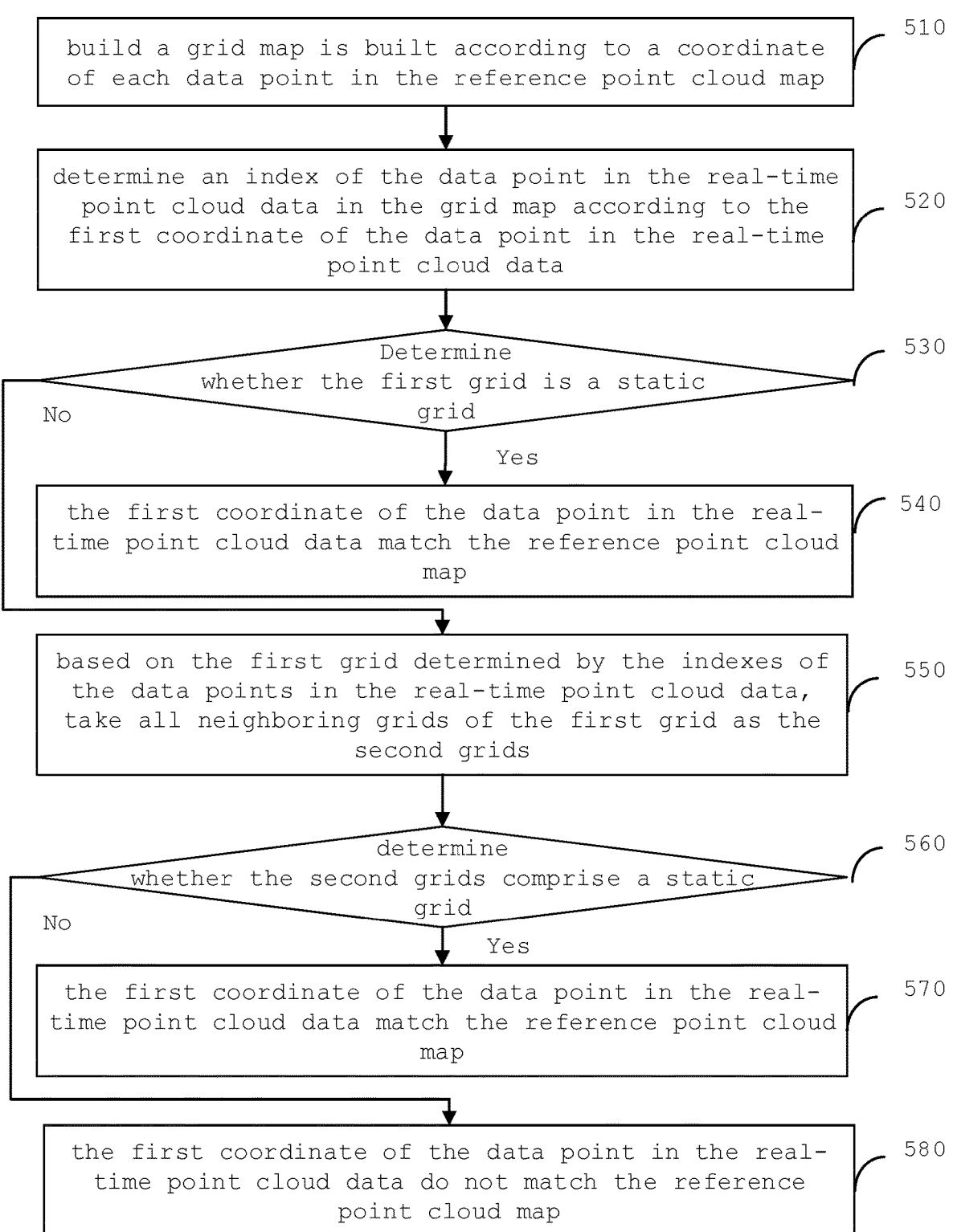

build a grid map is built according to a coordinate of each data point in the reference point cloud map — 510 determine an index of the data point in the real-time point cloud data in the grid map according to the first coordinate of the data point in the real-time point cloud data — 520

Determine whether the first grid is a static grid — 530

No

Yes the first coordinate of the data point in the real-time point cloud data match the reference point cloud map — 540 based on the first grid determined by the indexes of the data points in the real-time point cloud data, take all neighboring grids of the first grid as the second grids — 550 determine whether the second grids comprise a static grid — 560

No

Yes the first coordinate of the data point in the real-time point cloud data match the reference point cloud map — 570 the first coordinate of the data point in the real-time point cloud data do not match the reference point cloud map — 580

FIG. 5

| 1 | 0 | 0 | 1 | 1 |
|---|---|---|---|---|
| 1 | 0 | 0 | 0 | 0 |
| 1 | 1 | 0 | 0 | 0 |
| 1 | 1 | 1 | 1 | 1 |

FIG. 6a

| P | | | | |
|---|---|---|---|---|
| | P1 | P2 | P3 | |
| | P4 | P' | P5 | |
| | P6 | P7 | P8 | |

FIG. 6b

METHOD AND APPARATUS FOR IDENTIFYING DATA POINT, AND COMPUTER-READABLE STORAGE MEDIUM

CROSS-REFERENCE TO RELATED APPLICATIONS

This application is a U.S. National Stage Application under 35 U.S.C. § 371 of International Patent Application No. PCT/CN2021/102311, filed on Jun. 25, 2021, which is based on and claims priority from CN application No. 202010763397.5, filed on Jul. 31, 2020, the disclosure of both of which are hereby incorporated into this disclosure by reference in its entirety.

TECHNICAL FIELD

The present disclosure relates to the field of computer technologies, and in particular, to a method and an apparatus for identifying a data point, and a computer-readable storage medium.

BACKGROUND

During the automatic driving process of an automatic driving vehicle, according to the point cloud data measured by the laser radar, the automatic driving vehicle identifies obstacles by using the sensing technology, such as the position, the size, the posture, the type and the like of the obstacles, and performs subsequent path planning and speed planning of the vehicle according to the identification result of the obstacles.

SUMMARY

According to some embodiments of the present disclosure, a method for identifying a data point is provided. The method comprising: acquiring real-time point cloud data of a current position of a vehicle; converting a coordinate of a data point in the real-time point cloud data into a first coordinate under a coordinate system of a preset reference point cloud map, wherein the reference point cloud map comprises static data points; matching the first coordinate of the data point in the real-time point cloud data with the reference point cloud map; determining the data point in the real-time point cloud data as a static data point under a condition that the first coordinate of the data point in the real-time point cloud data matches the reference point cloud map.

In some embodiments, the method further comprising: determining the data point in the real-time point cloud data as a dynamic data point under a condition that the first coordinate of the data point in the real-time point cloud data does not match the reference point cloud map.

In some embodiments, the method further comprising: determining whether the reference point cloud map needs to be updated after acquiring the real-time point cloud data; updating the reference point cloud map under a condition that the reference point cloud map needs to be updated.

In some embodiments, the determining whether the reference point cloud map needs to be updated comprises: determining whether a distance between the current position of the vehicle and a last position of the vehicle in the reference point cloud map is greater than a preset threshold value; determining the reference point cloud map needs to be updated under a condition that the distance between the current position and the last position of the vehicle in the reference point cloud map is greater than the preset threshold value.

In some embodiments, the matching the first coordinate of the data point in the real-time point cloud data with the reference point cloud map comprises: building a KD-tree according to a coordinate of each data point in the reference point cloud map; searching in the KD-tree to determine whether there exists a second coordinate identical to the first coordinate of the data point in the real-time point cloud data; determining the first coordinate of the data point in the real-time point cloud data matches the reference point cloud map under a condition that there exists the second coordinate.

In some embodiments, determining whether there exists a third coordinate identical to an adjacent coordinate of the first coordinate of the data point in the real-time point cloud data under a condition that there does not exist the second coordinate; determining the first coordinate of the data point in the real-time point cloud data matches the reference point cloud map under a condition that there exists the third coordinate.

In some embodiments, determining the data point in the real-time point cloud data as a dynamic data point under a condition that there does not exist the third coordinate.

In some embodiments, the matching the first coordinate of the data point in the real-time point cloud data with the reference point cloud map comprises: building a grid map according to a coordinate of each data point in the reference point cloud map, wherein a grid comprising static data points in the grid map are marked as a static grid, and a grid not comprising the static data points are marked as a dynamic grid; determining an index of the data point in the real-time point cloud data in the grid map according to the first coordinate of the data point in the real-time point cloud data; determining whether a first grid determined by the index of the data point in the real-time point cloud data is a static grid; determining the first coordinate of the data point in the real-time point cloud data matches the reference point cloud map under a condition that the first grid is a static grid.

In some embodiments, taking all neighboring grids of the first grid as second grids under a condition that the first grid is not the static grid; determining whether the second grids comprises a static grid; determining the first coordinates of the data point in the real-time point cloud data matches the reference point cloud map under a condition that the second grids comprises the static grid.

In some embodiments, determining the first coordinates of the data point in the real-time point cloud data does not match the reference point cloud map under a condition that the second grids do not comprise the static grid.

In some embodiments, filtering data points in the real-time point cloud data larger than a preset range.

In some embodiments, acquiring point cloud map data within a preset range centered on the current position, and updating the reference point cloud map according to the acquired point cloud map data.

According to still other embodiments of the present disclosure, an apparatus for identifying a data point is provided, the apparatus comprising: a processor; a memory coupled to the processor, storing program instructions which, when executed by the processor, cause the processor to: acquire real-time point cloud data of a current position of a vehicle; convert a coordinate of a data point in the real-time point cloud data into a first coordinate under a coordinate system of a preset reference point cloud map, wherein the reference point cloud map comprises static data points; match the first coordinate of the data point in the real-time point cloud data with the reference point cloud map; determine the data point in the real-time point cloud data as a static data point under a condition that the first coordinate of the data point in the real-time point cloud data matches the reference point cloud map.

According to still further embodiments of the present disclosure, there is provided a non-transitory computer-readable storage medium, which stores a computer program that, when executed by a processor, cause the processor to: acquire real-time point cloud data of a current position of a vehicle; convert a coordinate of a data point in the real-time point cloud data into a first coordinate under a coordinate system of a preset reference point cloud map, wherein the reference point cloud map comprises static data points; match the first coordinate of the data point in the real-time point cloud data with the reference point cloud map; determine the data point in the real-time point cloud data as a static data point under a condition that the first coordinate of the data point in the real-time point cloud data matches the reference point cloud map.

BRIEF DESCRIPTION OF THE DRAWINGS

The drawings that need to be used in the description of the embodiments or related art will be briefly described below. The present disclosure will be more clearly understood from the following detailed description, which proceeds with reference to the accompanying drawings.

Apparently, the drawings in the following description are merely examples of the disclosure and that other drawings may be derived by those of ordinary skill in the art without paying inventive effort.

FIG. 1 illustrates a schematic flow diagram of a method for identifying a data point according to some embodiments of the present disclosure.

FIG. 2 illustrates a schematic flow diagram for updating a reference point cloud map according to some embodiments of the present disclosure.

FIG. 3 illustrates a schematic diagram of a KD-tree based matching method according to some embodiments of the present disclosure.

FIG. 5 illustrates a schematic diagram of a grid map based matching method according to some embodiments of the present disclosure.

FIG. 6a illustrates a built grid map according to some embodiments of the present disclosure.

FIG. 6b illustrates a schematic diagram of determining a second grid using a grid map according to some embodiments of the present disclosure.

DETAILED DESCRIPTION

Figure 4:
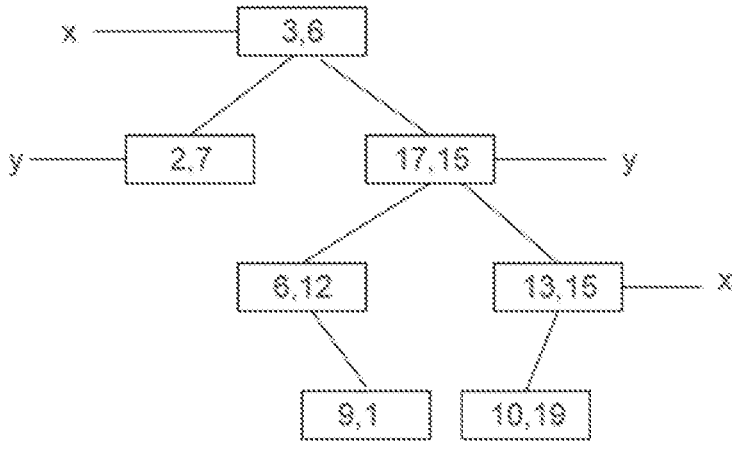
FIG. 4 illustrates a built KD-tree according to some embodiments of the present disclosure.

The inventor found that, in the related art, when point cloud data is processed by using the perception technology, all data points of obstacles in the point cloud data are processed without distinguishing, and it is difficult to distinguish data points of static obstacles (such as buildings, trees and telegraph poles) from data points of dynamic obstacles (such as pedestrians and vehicles), such that the false identification of the data points of the static obstacles (i.e. the static data points) and the data points of the dynamic obstacles (i.e. the dynamic data points) brings about a great safety hazard to the automatic driving of the vehicle.

Accordingly, the present disclosure provides a solution for identifying the data point, which can accurately identify the data points of the static obstacles, thereby to guarantee safety for automatic driving of the vehicle.

The technical solutions in the embodiments of the present disclosure will be clearly and completely described below with reference to the drawings of the embodiments of the present disclosure.

Unless specifically stated otherwise, the descriptions of "first", "second" and "third", etc. in this disclosure are used to distinguish different objects, and are not used to indicate the meaning of size or timing, etc.

FIG. 1 illustrates a schematic flow diagram of a method for identifying a data point according to some embodiments of the present disclosure. The method can be performed, for example, by an apparatus for identifying a data point.

The method for identifying the data point can be executed in a main thread, and a step of updating a reference point cloud map can be executed in a sub-thread. The main thread acquires real-time point cloud data and the reference point cloud map updated by the sub-thread, and then converts coordinates of the data points in the real-time point cloud data into a coordinate system of the reference point cloud map and perform matching, at last, determines static data points or dynamic data points according to a matching result.

As shown in FIG. 1, the method of this embodiment comprises steps 110-140.

In step 110, real-time point cloud data of a current position of a vehicle is acquired.

For example, the Real-time point cloud data of the current position of the vehicle may be acquired by a lidar scanning device on the vehicle.

In some embodiments, the method further comprises: the data points in the real-time point cloud data larger than a preset range are filtered. For example, the data points that are greater than the preset height are filtered out, or the data points that are greater than a preset distance are filtered out. By filtering the data points in the real-time point cloud data, the amount of calculation can be reduced, and a foundation is laid for subsequently improving the identification efficiency.

In some embodiments, after the real-time point cloud data is acquired, it is further determined whether the reference point cloud map needs to be updated.

For example, it is determined whether a distance between the current position of the vehicle and a last position of the vehicle in the reference point cloud map is greater than a preset threshold value. It is determined the reference point cloud map needs to be updated under a condition that the distance between the current position and the last position of the vehicle in the reference point cloud map is greater than the preset threshold value. The reference point cloud map only comprises static data points.

If the determining result is that the reference point cloud map needs to be updated, the reference point cloud map is updated. For example, the reference point cloud map may be updated according to the schematic flow chart of updating the reference point cloud map shown in FIG. 2. It should be noted that the steps of updating the reference point cloud map may be processed by another sub-thread, which does not affect the execution process of the main thread and improves efficiency.

In step 120, a coordinate of a data point in the real-time point cloud data is converted into a first coordinate under a coordinate system of a preset reference point cloud map, wherein the reference point cloud map comprises static data points.

If the real-time point cloud data is acquired through the lidar scanning equipment, the coordinates of each data point in the real-time point cloud data under the lidar coordinate system are converted into the coordinates (i.e. first coordinates) under the coordinate system of a preset reference point cloud map. The coordinates of the data points may be, for example, two-dimensional coordinates, denoted as $(x, y)$; the coordinates of the data point may also be, e.g., three-dimensional coordinates denoted as $(x, y, z)$.

At step 130, the first coordinate of the data point in the real-time point cloud data is matched with the reference point cloud map.

There are two matching methods for matching the first coordinate of a data point in the real-time point cloud data with the reference point cloud map: a KD (K-Dimensional)-tree based matching method, and a grid map based matching method. The KD-tree based matching method is described in the embodiment of FIG. 3, and the grid map based matching method is described in the embodiment of FIG. 4.

In step 140, the data point in the real-time point cloud data is determined as a static data point under a condition that the first coordinate of the data point in the real-time point cloud data matches the reference point cloud map.

In some embodiments, the data point in the real-time point cloud data is determined as a dynamic data point under a condition that the first coordinate of the data point in the real-time point cloud data does not match the reference point cloud map.

In the above embodiment, the data point in the real-time point cloud data is matched with the reference point cloud map that only comprises static data points, the data point in the matched real-time point cloud data is determined as static data points, and the data point in the non-matched real-time point cloud data is determined as dynamic data points. The data points of the static obstacles and the data points of the dynamic obstacles can be accurately identified, such that safety is guaranteed for subsequent path planning. Meanwhile, by using the KD-tree and the grid map, the searching and matching process can be accelerated, and the identification efficiency is improved.

FIG. 2 illustrates a schematic flow diagram for updating a reference point cloud map according to some embodiments of the present disclosure.

As shown in FIG. 2, the method of this embodiment comprises steps 210-240.

In step 210, point cloud map data within a preset range centered on the current position of the vehicle is acquired.

For example, the point cloud map data within a preset range centered on the current position is continuously acquired by a lidar scanning device.

In step 220, the reference point cloud map is updated according to the acquired point cloud map data.

Continuously acquired point cloud map data are spliced and corrected by using high-precision integrated navigation equipment to generate a point cloud map in a three-dimensional space, and the data points where dynamic obstacles (such as pedestrians, vehicles and the like) are located in the point cloud map are removed by using a manual labeling or machine learning method to obtain a reference point cloud map, such that the reference point cloud map serves as a reference for subsequent matching and identifying steps, i.e., the data points that is matched with the data points in the reference point cloud map are identified as static data points.

In some embodiments, the method for updating the reference point cloud map further includes at least one of down-sampling the reference point cloud map data and filtering the data points of the reference point cloud map that are larger than a preset range.

The reference point cloud map data is subjected to down-sampling processing with preset resolution, such that the density of data points can be reduced, and the form of the point cloud is kept unchanged. Through the down-sampling processing, the amount of calculation can be greatly reduced, and meanwhile, the accuracy of subsequent calculation is ensured.

For example, the data points of the reference point cloud map that are greater than a preset height are filtered out, or the data points of the reference point cloud map that are greater than a preset distance may also be filtered out. After the reference point cloud map is filtered out, the point cloud data in the actually required range of the vehicle can be reserved, such that accuracy of subsequent identification is ensured while reducing the amount of calculation.

In the above embodiment, the reference point cloud map provides a reference for identifying static data points and dynamic data points, and guarantees the accuracy of subsequent identifying of static data points. In addition, the step of updating the reference point cloud map is executed in a sub-thread, so that the overall recognition efficiency can be improved.

FIG. 3 shows a schematic diagram of a KD-tree based matching method according to some embodiments of the present disclosure.

As shown in FIG. 3, the method of this embodiment comprises steps 310-370.

At step 310, a KD-tree is built according to a coordinate of each data point in the reference point cloud map.

During building the KD-tree, the nodes of the tree are split, for example, according to the value of one of the coordinates of the data points, until each node in the KD-tree contains the coordinates of one data point. For example, by comparing the coordinate value of the data point to be inserted currently with the coordinate value of the data point corresponding to the parent node, the data points corresponding to the coordinate value smaller than that of the parent node are inserted into the left subtree of the parent node, and the data point corresponding to the coordinate value greater than or equal to that of the parent node are inserted into the right subtree of the parent node.

For example, there are 7 data points A, B, C, D, E, F, G in the two-dimensional reference point cloud map, and the coordinates of these 7 data points are represented as $(3, 6)$, $(17, 15)$, $(13, 15)$, $(6, 12)$, $(9, 1)$, $(2, 7)$, $(10, 19)$, respectively. As shown in FIG. 4, a built KD-tree according to some embodiments of the present disclosure is shown.

(1) First, a root node is determined, for example, the data point A $(3, 6)$ is taken as the root node.

(2) Next, the data point B $(17, 15)$ is inserted. Assume that root node A is x-aligned, i.e., the coordinate value of data point A $(3, 6)$ of the root node (i.e., the parent node of data point B) is compared with the coordinate value of x of data point B $(17, 15)$ to determine whether data point B is in the right subtree or the right sub-tree of root node A, and because 17>3, the data point B is inserted into the right subtree of root node A. Assume that data point B is y-aligned.

(3) the data point C (13, 15) is inserted. The x-coordinate values of data point C and data point A (i.e. the parent node of data point C) are compared, and since 13>3, the data point C in inserted into the right subtree of root node A; then, the y-coordinate values of data point C and data point B (i.e., the parent node of data point C) are compared, and since 15=15, the data point C is inserted into the right subtree of data point B. Assume that data point C is x-aligned.

(4) the data point D (6, 12) is inserted. The x-coordinate values of data point D and data point A (i.e., the parent node of data point D) are compared, and because 6>3, the data point D is inserted into the right subtree of root node A; then, the y-coordinate values of data point D and data point B (i.e., the parent node of data point D) are compared, and because 12<15, the data point D is inserted into the left subtree of data point B. Assume that data point D is y-aligned.

(5) the data point E (9, 1) is inserted, and according to the method described above, the data point E is inserted into the right subtree of data point D. Assume that data point E is x-aligned.

(6) the data point F (2, 7) is inserted, and according to the method described above, the data point F is inserted into the left subtree of data point A. Assume that data point Dis y-aligned.

(7) the data point G (10, 19) is inserted, and according to the method described above, the data point G is inserted into the left subtree of data point C.

At this point, 7 data points in the reference point cloud map are respectively located on one node of the KD-tree, thereby building the built KD-tree shown in FIG. 4.

Returning to FIG. 3, the process proceeds to step 320.

At step 320, it is searched in the KD-tree to determine whether there exists a second coordinate identical to the first coordinate of the data point in the real-time point cloud data.

Assuming that there are data points a (15, 12) and b (9, 1) in the real-time point cloud data, for example, the data points a (15, 12) is searched in the built KD-tree as shown in FIG. 4, and it is determined whether there is a second coordinate identical to the first coordinate of the data point in the real-time point cloud data. The determining steps are as follows:

(1) the x-coordinate value of data point a (15, 12) is compared with the x-coordinate value of root node A (3, 6), and since 15>3, the search continues in the right subtree of A.

(2) Next, the y-coordinate value of data point a (15, 12) is compared with the y-coordinate value of the first node data point B (17, 15) in the right subtree of A, and since 12<15, the search continues in the left subtree of data point B (17, 15).

(3) The x-coordinate value of a (15, 12) is compared with the x-coordinate value of data point D (6, 12), and since 15>6, the search continues in the right sub-tree of data point D (6, 12).

(4) The y-coordinate value of a (15, 12) is compared with the y-coordinate value of data point E (9, 1), and since 12>1, the search continues in the right sub-tree of data point E (9, 1).

(5) Because the right subtree of data point E (9, 1) is empty, the data point a (15, 12) is not in the KD-tree. That is, the data point a is not in the reference point cloud map.

Referring to the above method, the data point b (9, 1) is searched in the KD-tree, and in step (5), a data point E (9, 1) having the same coordinate values as the data point b (9, 1) can be found through searching.

If there exists the second coordinates, go to step 330; otherwise, step 340 is performed.

At step 330, the first coordinate of the data point in the real-time point cloud data is determined to match with the reference point cloud map.

For example, if the data point E (9, 1) having the same coordinate value as the data point b (9, 1) in the real-time point cloud data is found through searching in the KD-tree, the first coordinates of the data point in the real-time point cloud data match the reference point cloud map. Under a condition that the first coordinates of the data point b (9, 1) in the real-time point cloud data match the reference point cloud map (i.e., the data point E (9, 1)), the data point b (9, 1) in the real-time point cloud data is determined as a static data point.

At step 340, it is determined whether there exists a third coordinate identical to an adjacent coordinate of the first coordinate of the data point in the real-time point cloud data.

For example, under a condition that the second coordinate having the same coordinate values as those of the data point a (15, 12) in the real-time point cloud data are not found through searching in the KD-tree, it is determined whether there exists the third coordinate identical to the adjacent coordinates of the first coordinates of the data point in the real-time point cloud data. That is, the same third coordinates as the adjacent coordinates (14, 12), (15, 11), (16, 12), (15, 13) of the data point a (15, 12) in the real-time point cloud data are determined.

If there exists the third coordinate, go to step 350; otherwise, step 360 is performed.

At step 350, the first coordinate of the data point in the real-time point cloud data is determined to match with the reference point cloud map.

At step 360, the first coordinates of the data points in the real-time point cloud data does not match the reference point cloud map.

In step 370, under a condition that the first coordinate of the data points in the real-time point cloud data does not match with the reference point cloud map, the data point in the real-time point cloud data is determined as a dynamic data point.

For example, after searching, if the third coordinate which is the same as the neighboring coordinates (14, 12), (15, 11), (16, 12), (15, 13) of the data point a (15, 12) in the real-time point cloud data is not searched in the built KD-tree as shown in FIG. 4, it is determined that the first coordinate of the data point a in the real-time point cloud data does not match the reference point cloud map. The data point a (15, 12) in the real-time point cloud data is determined as the dynamic data point under a condition that the first coordinate of the data point a (15, 12) in the real-time point cloud data does not match the reference point cloud map.

In the above embodiment, the KD-tree is built according to the reference point cloud map, and it is determined whether there is a data point in the reference point cloud map that matches the data point in the real-time point cloud data and the data points having adjacent coordinate values by searching the KD-tree, so as to determine that the data point in the real-time point cloud data is a static data point or a dynamic data point. Searching and matching based on the KD-tree improves the efficiency of identifying data points.

FIG. 5 illustrates a schematic diagram of a grid map based matching method according to some embodiments of the present disclosure.

As shown in FIG. 5, the method of this embodiment includes steps 510-580.

In step 510, a grid map is built according to a coordinate of each data point in the reference point cloud map, wherein a grid comprising static data points in the grid map are marked as a static grid, and a grid not comprising the static data points are marked as a dynamic grid.

The grid in the grid map is determined to be a static grid or a dynamic grid according to data points (namely static data points) comprised in the reference point cloud map, namely, if there exist the data points in the reference point cloud map in the grid, the grid is determined to be the static grid; if the data points in the reference point cloud map do not exist in the grid, the grid is determined to be a dynamic grid.

As shown in FIG. 6a, FIG. 6a illustrates a built grid map according to some embodiments of the present disclosure.

For example, the grid map may be a map in a two-dimensional coordinate system, and if data points in the reference point cloud map exists in a grid in the grid map, the grid is regarded as the static grid (e.g., marked as 1); if no data point in the reference point cloud map exists in the grid, the grid is regarded as the dynamic grid (e.g., marked as 0).

For another example, the grid map may also be a map in a three-dimensional coordinate system, and for simplicity, the method for building the grid map in the three-dimensional coordinate system may refer to the method for building a grid map in a two-dimensional coordinate system, which is not described herein again.

Returning to FIG. 5, execution continues at step 520.

At step 520, an index of the data point in the real-time point cloud data in the grid map is determined according to the first coordinate of the data point in the real-time point cloud data.

For instance, take as an example a reference point cloud map in a range of 30 meters each in front of and behind the vehicle, 15 meters each to the left and the right of the vehicle and 2 meters each above and below the vehicle, with the current position of the vehicle as a center. Let O denote the origin of the lidar coordinate system of the vehicle, i.e., the current position of the vehicle, the forward direction of the x-axis is directed to the front of the traveling vehicle, the forward direction of the y-axis is directed to the front of the traveling vehicle, and the forward direction of the z-axis is directed to the sky. Assuming that the size of each grid in the grid map is 0.1×0.1×0.1 meters, the size of the grid map is 600×300×40, and the origin O is located at the center of the grid map. The number of grids on the x-axis of the lidar point cloud coordinate system is 30×2/0.1=600, and the number of grids on the y-axis of the lidar point cloud coordinate system is 15×2/0.1=300, and the number of grids on the Z-axis of the lidar point cloud coordinate system is 2×2/0.1=40. Therefore, the grid index refers to an index (i, j, k) of a certain data point (x, y, z) in the grid map, for example, a grid with an index of (0, 0, 0) is located at a point corresponding to a lower right corner in the grid map, that is, the grids in the grid map are counted from the lower right corner of the grid map. According to the above definition of the coordinate system and the grid index starting point, the index $(i_x, j_y, k_z)$ corresponding to the data point (x, y, z) can be calculated by using the following formula:

$$\begin{cases} i_x = (x+30)/0.1 \\ j_y = (y+15)/0.1 \\ k_z = (z+2)/0.1 \end{cases}$$

In the embodiment, the coordinates of the data points in the coordinate system of the reference point cloud map are converted into the indexes in the grid map, which lays the foundation for subsequent quick searching and matching.

At step 530, it is determined whether the first grid determined by the index of the data point in the real-time point cloud data is a static grid.

If the first grid is the static grid, go to step 540; if the first grid is not the static grid, step 550 is performed.

At step 540, it is determined the first coordinate of the data point in the real-time point cloud data matches the reference point cloud map.

For example, if it is determined that the first grid is the static grid, the first coordinate of the data point in the real-time point cloud data match the reference point cloud map. And under a condition that the first coordinate of the data point in the real-time point cloud data matches the reference point cloud map, the data point in the real-time point cloud data is determined to be the static data point.

For example, according to the built grid map shown in FIG. 6a and the first grid P shown in FIG. 6b, it can be determined that the first grid P is a static grid (marked as 1), and the first coordinate of the data point in the corresponding real-time point cloud data matches the reference point cloud map.

At step 550, all neighboring grids of the first grid are taken as the second grids.

Under a condition that the first grid is not the static grid, all neighboring grids of the first grid are taken as second grids.

For example, the grid map may be a map in a two-dimensional coordinate system, and there are 8 neighboring grids of the first grid, that is, there are 8 second grids correspondingly. As shown in FIG. 6b, FIG. 6b illustrates a schematic diagram of determining a second grid using a grid map according to some embodiments of the present disclosure. Assuming that the first grid determined from the indexes of the data points in the real-time point cloud data is denoted as P', since the first grid P' is marked as 0, i.e., the first grid P' is not the static grid, the neighboring grids of the first grid P' are searched, and it can be seen that there are 8 neighboring grids of the first grid P', which are marked as a second grid P1, a second grid P2, a second grid P3, a second grid P4, a second grid P5, a second grid P6, a second grid P7, and a second grid P8, respectively.

For another example, the grid map may also be a map in a three-dimensional coordinate system, and there are 26 neighboring grids of the first grid, that is, 26 second grids correspondingly.

At step 560, it is determined whether the second grids comprises a static grid.

For example, according to the built grid map shown in FIG. 6a and all the second grids corresponding to the grid P' shown in FIG. 6b, it can be derived that the second grid P4, the second grid P6, the second grid P7, and the second grid P8 are all marked as 1, that is, it is determined that all the second grids corresponding to the grid P' include static grids.

If the second grid includes the static grids, step 570 is performed; if the second grid does not include the static grids, step 580 is performed.

At step 570, it is determined that the first coordinates of the data point in the real-time point cloud data matches the reference point cloud map.

For example, if it is determined that the second grid comprises a static grid, then the first coordinate of the data points in the real-time point cloud data match the reference point cloud map. And under a condition that the first coordinate of the data points in the real-time point cloud data matches the reference point cloud map, the data points in the real-time point cloud data are determined as the static data point.

At step 580, it is determined that the first coordinates of the data point in the real-time point cloud data does not match the reference point cloud map.

If the second grids are not the static grids, it is determined that the first coordinate of the data point in the real-time point cloud data does not match the reference point cloud map. And under a condition that the first coordinate of the data point in the real-time point cloud data does not match the reference point cloud map, the data point in the real-time point cloud data is determined as the dynamic data point.

In the above embodiment, a grid map is built according to the reference point cloud map, and an index of a data point of the real-time point cloud data in the grid map is determined, and it is determined whether the grid in the grid map is the static grid by using the data point index of the real-time point cloud data to search the grid map, and it is determined whether the reference point cloud map matches the data point in the real-time point cloud data, thereby determining the data point in the real-time point cloud data to be the static data point or the dynamic data point. Searching and matching based on the grid map improves the efficiency of identifying data points.

Figure 7:
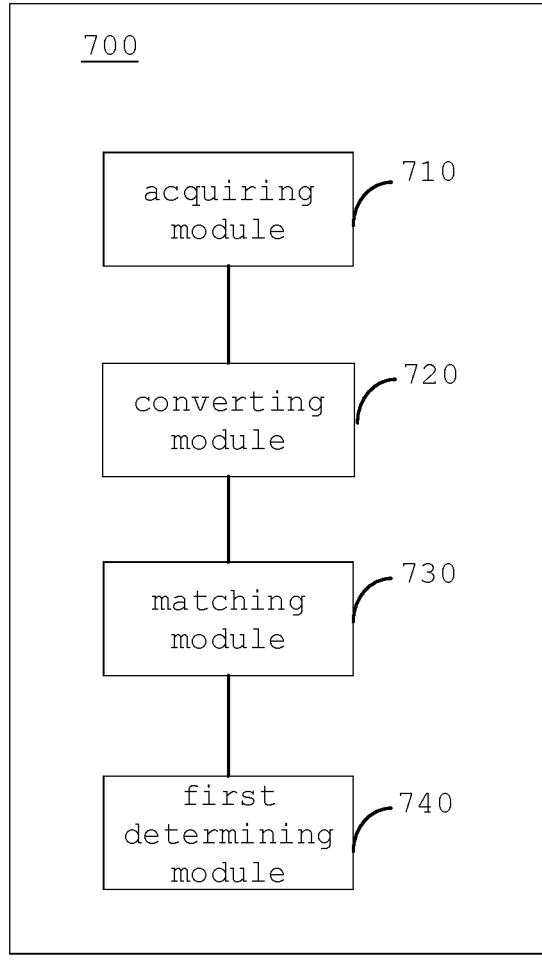
FIG. 7 shows a schematic diagram of an apparatus for identifying a data point according to some embodiments of the present disclosure.

FIG. 7 shows a schematic diagram of an apparatus for identifying the data point according to some embodiments of the present disclosure.

As shown in FIG. 7, the data point identification apparatus 700 of this embodiment comprises: an acquiring module 710, a converting module 720, a matching module 730, and a first determining module 740.

The acquiring module 710 is configured to acquire real-time point cloud data of a current position of a vehicle. In some embodiments, the acquiring module 710 is further configured to filter data points in the real-time point cloud data in a range larger than the preset range.

The converting module 720 is configured to convert a coordinate of a data point in the real-time point cloud data into a first coordinate under a coordinate system of a preset reference point cloud map, wherein the reference point cloud map comprises static data points.

The matching module 730 is configured to match the first coordinate of the data point in the real-time point cloud data with the reference point cloud map.

In some embodiments, the matching module 730 is further configured to build a KD-tree according to a coordinate of each data point in the reference point cloud map, and search in the KD-tree to determine whether there exists a second coordinate identical to the first coordinate of the data point in the real-time point cloud data. Under a condition that there exists the second coordinate, the matching module 730 determines the first coordinate of the data point in the real-time point cloud data matches the reference point cloud map, otherwise, the matching module 730 determines whether there exists a third coordinate identical to an adjacent coordinate of the first coordinate of the data point in the real-time point cloud data. Under a condition that there exists the third coordinate, the matching module 730 determines the first coordinate of the data point in the real-time point cloud data matches the reference point cloud map, otherwise, the matching module 730 determines the data point in the real-time point cloud data as a dynamic data point.

In other embodiments, the matching module 730 is further configured to build a grid map according to a coordinate of each data point in the reference point cloud map, wherein a grid comprising static data points in the grid map are marked as a static grid, and a grid not comprising the static data points are marked as a dynamic grid. The matching module 730 determines an index of the data point in the real-time point cloud data in the grid map according to the first coordinate of the data point in the real-time point cloud data, and determines whether a first grid determined by the index of the data point in the real-time point cloud data is a static grid. Under a condition that the first grid is a static grid, the matching module 730 determines the first coordinate of the data point in the real-time point cloud data matches the reference point cloud map, otherwise, the matching module 730 takes all neighboring grids of the first grid as second grids, and determines whether the second grids comprises a static grid. Under a condition that the second grids comprises the static grid, the matching module 730 determines the first coordinates of the data point in the real-time point cloud data matches the reference point cloud map, otherwise, the matching module 730 determines the first coordinates of the data point in the real-time point cloud data does not match the reference point cloud map.

The first determining module 740 is configured to determine the data point in the real-time point cloud data as a static data point under a condition that the first coordinate of the data point in the real-time point cloud data matches the reference point cloud map.

Figure 8:
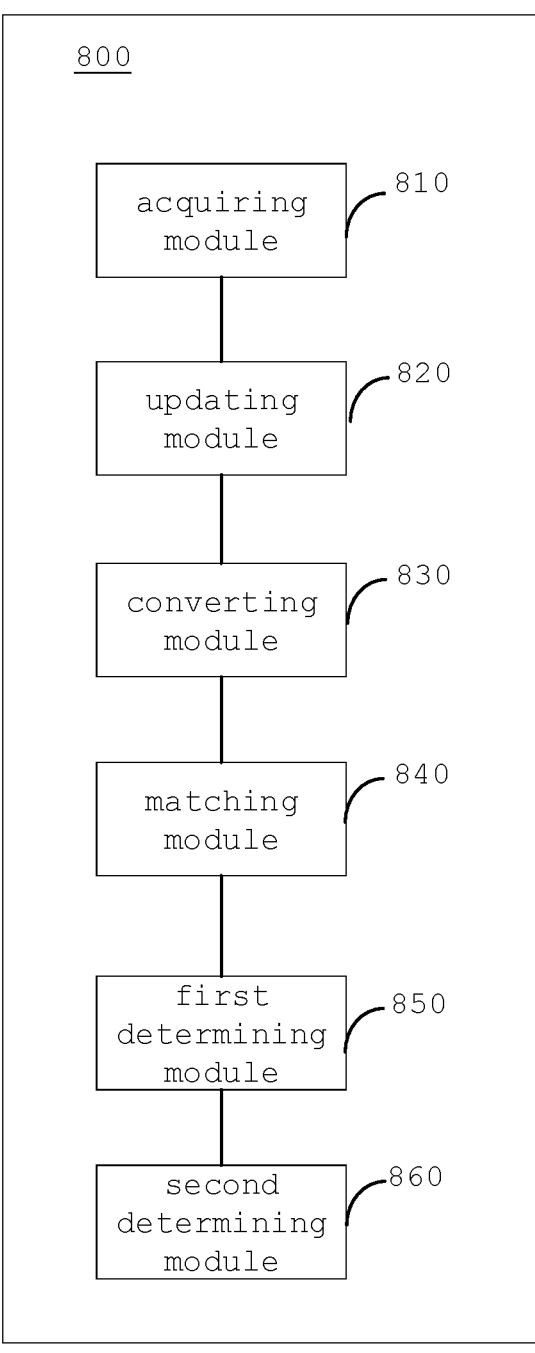
FIG. 8 shows a schematic diagram of an apparatus for identifying a data point according to other embodiments of the present disclosure.

FIG. 8 shows a schematic diagram of an apparatus for identifying the data point according to other embodiments of the present disclosure.

As shown in FIG. 8, the data point identification apparatus 800 of this embodiment comprises: an acquiring module 810, an updating module 820, a converting module 830, a matching module 840, a first determining module 850, and a second determining module 860.

The acquiring module 810 is configured to acquire real-time point cloud data of a current position of a vehicle. In some embodiments, the acquiring module 810 is further configured to filter data points in the real-time point cloud data in a range larger than the preset range.

The updating module 820 is configured to determine whether the reference point cloud map needs to be updated after acquiring the real-time point cloud data, and update the reference point cloud map under a condition that the reference point cloud map needs to be updated. Wherein determining whether the reference point cloud map needs to be updated comprising: determining whether a distance between the current position of the vehicle and a last position of the vehicle in the reference point cloud map is greater than a preset threshold value, and determining the reference point cloud map needs to be updated under a condition that the distance between the current position and the last position of the vehicle in the reference point cloud map is greater than the preset threshold value. In some embodiments, the updating module 820 acquires point cloud map data within a preset range centered on the current position and updates the reference point cloud map according to the acquired point cloud map data.

The converting module 830 is configured to convert a coordinate of a data point in the real-time point cloud data into a first coordinate under a coordinate system of a preset reference point cloud map, wherein the reference point cloud map comprises static data points.

The matching module 840 is configured to match the first coordinate of the data point in the real-time point cloud data with the reference point cloud map.

In some embodiments, the matching module 840 is further configured to build a KD-tree according to a coordinate of each data point in the reference point cloud map, and search in the KD-tree to determine whether there exists a second coordinate identical to the first coordinate of the data point in the real-time point cloud data. Under a condition that there exists the second coordinate, the matching module 840 determines the first coordinate of the data point in the real-time point cloud data matches the reference point cloud map, otherwise, the matching module 840 determines whether there exists a third coordinate identical to an adjacent coordinate of the first coordinate of the data point in the real-time point cloud data. Under a condition that there exists the third coordinate, the matching module 840 determines the first coordinate of the data point in the real-time point cloud data matches the reference point cloud map, otherwise, the matching module 840 determines the data point in the real-time point cloud data as a dynamic data point.

In other embodiments, the matching module 840 is further configured to build a grid map according to a coordinate of each data point in the reference point cloud map, wherein a grid comprising static data points in the grid map are marked as a static grid, and a grid not comprising the static data points are marked as a dynamic grid. The matching module 840 determines an index of the data point in the real-time point cloud data in the grid map according to the first coordinate of the data point in the real-time point cloud data, and determines whether a first grid determined by the index of the data point in the real-time point cloud data is a static grid. Under a condition that the first grid is a static grid, the matching module 840 determines the first coordinate of the data point in the real-time point cloud data matches the reference point cloud map, otherwise, the matching module 840 takes all neighboring grids of the first grid as second grids, and determines whether the second grids comprises a static grid. Under a condition that the second grids comprises the static grid, the matching module 840 determines the first coordinates of the data point in the real-time point cloud data matches the reference point cloud map, otherwise, the matching module 840 determines the first coordinates of the data point in the real-time point cloud data does not match the reference point cloud map.

The first determining module 850 is configured to determine the data point in the real-time point cloud data as a static data point under a condition that the first coordinate of the data point in the real-time point cloud data matches the reference point cloud map.

The second determining module 860 is configured to determine the data point in the real-time point cloud data as the dynamic data point under a condition that the first coordinate of the data point in the real-time point cloud data does not match the reference point cloud map.

Figure 9:
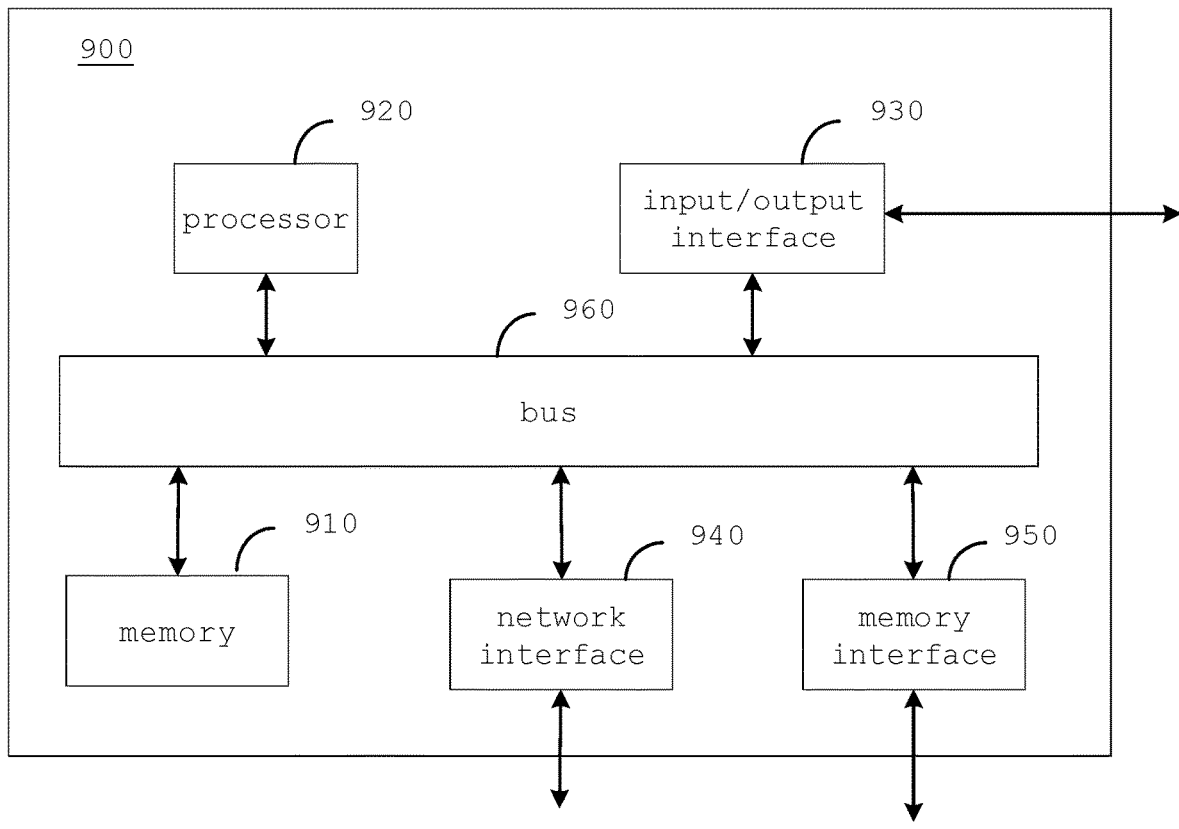
FIG. 9 illustrates a schematic diagram of an apparatus for identifying a data point according to still other embodiments of the present disclosure.

FIG. 9 illustrates a schematic diagram of an apparatus for identifying the data point according to still other embodiments of the present disclosure.

As shown in FIG. 9, the apparatus 900 for identifying the data point of this embodiment comprises: a memory 901 and a processor 902 coupled to the memory 901, the processor 902 configured to perform a method for identifying the data point in any of the embodiments of the present disclosure based on instructions stored in the memory 901.

The memory 901 may include, for example, a system memory, a fixed nonvolatile storage medium, and the like. The system memory stores, for example, an operating system, an application program, a Boot Loader (Boot Loader), and other programs.

The apparatus 900 for identifying the data point may further include an input and output interface 903, a network interface 904 and a storage interface 905, etc. These interfaces 903, 904, 905 and the memory 901 and the processor 902 may be connected with each other, for example, via a bus 906. The input and output interface 903 provides a connection interface for the input and output devices such as a display, a mouse, a keyboard, and a touch screen. The network interface 904 provides a connection interface for a variety of networking devices. The storage interface 905 provides a connection interface for external storage devices such as an SD card and a USB disk.

As will be appreciated by one of skill in the art, embodiments of the present disclosure may be provided as a method, system, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer-non-transitory readable storage media (including, but not limited to, disk storage, CD-ROM, optical storage, etc.) having computer program code embodied therein.

The present disclosure is described with reference to flowchart illustrations and/or block diagrams of methods, apparatus (systems), and computer program products according to embodiments of the disclosure. It will be understood that each flow and/or block of the flowchart illustrations and/or block diagrams, and combinations of flows and/or blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart flow or flows and/or block diagram block or blocks.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart flow or flows and/or block diagram block or blocks.

The above description is meant to be illustrative of the preferred embodiments of the present disclosure and not to be taken as limiting the disclosure, and any modifications, equivalents, improvements and the like that are within the spirit and scope of the present disclosure are intended to be included therein.

What is claimed is:

1. A method for identifying a data point, comprising:
acquiring real-time point cloud data of a current position of a vehicle by a lidar scanning device on the vehicle;
converting a coordinate of a data point in the real-time point cloud data into a first coordinate under a coordinate system of a preset reference point cloud map, wherein the reference point cloud map comprises static data points;

matching the first coordinate of the data point in the real-time point cloud data with the reference point cloud map, comprising:

building a KD-tree according to a coordinate of each data point in the reference point cloud map;

searching in the KD-tree to determine whether there exists a second coordinate identical to the first coordinate of the data point in the real-time point cloud data;

determining the first coordinate of the data point in the real-time point cloud data matches the reference point cloud map under a condition that there exists the second coordinate;

determining whether there exists a third coordinate identical to an adjacent coordinate of the first coordinate of the data point in the real-time point cloud data under a condition that there does not exist the second coordinate;

determining the first coordinate of the data point in the real-time point cloud data matches the reference point cloud map under a condition that there exists the third coordinate; and determining the data point in the real-time point cloud data as a dynamic data point under a condition that there does not exist the third coordinate; and determining the data point in the real-time point cloud data as a static data point under a condition that the first coordinate of the data point in the real-time point cloud data matches the reference point cloud map, to perform path planning for the vehicle according to the static data point and the dynamic data point.

2. The method for identifying the data point according to claim 1, further comprising:

determining the data point in the real-time point cloud data as a dynamic data point under a condition that the first coordinate of the data point in the real-time point cloud data does not match the reference point cloud map.

3. The method for identifying the data point according to claim 1, further comprising:

determining whether the reference point cloud map needs to be updated after acquiring the real-time point cloud data; and updating the reference point cloud map under a condition that the reference point cloud map needs to be updated.

4. The method for identifying the data point according to claim 3, wherein the determining whether the reference point cloud map needs to be updated comprises:

determining whether a distance between the current position of the vehicle and a last position of the vehicle in the reference point cloud map is greater than a preset threshold value; and determining the reference point cloud map needs to be updated under a condition that the distance between the current position and the last position of the vehicle in the reference point cloud map is greater than the preset threshold value.

5. The method for identifying the data point according to claim 1, wherein the matching the first coordinate of the data point in the real-time point cloud data with the reference point cloud map comprises:

building a grid map according to a coordinate of each data point in the reference point cloud map, wherein a grid comprising static data points in the grid map is marked as a static grid, and a grid not comprising the static data points is marked as a dynamic grid;

determining an index of the data point in the real-time point cloud data in the grid map according to the first coordinate of the data point in the real-time point cloud data;

determining whether a first grid determined by the index of the data point in the real-time point cloud data is a static grid; and determining the first coordinate of the data point in the real-time point cloud data matches the reference point cloud map under a condition that the first grid is a static grid.

6. The method for identifying the data point according to claim 5, wherein the matching the first coordinate of the data point in the real-time point cloud data with the reference point cloud map comprises:

taking all neighboring grids of the first grid as second grids under a condition that the first grid is not the static grid;

determining whether the second grids comprises a static grid; and determining the first coordinate of the data point in the real-time point cloud data matches the reference point cloud map under a condition that the second grids comprises the static grid.

7. The method for identifying the data point according to claim 6, wherein the matching the first coordinate of the data point in the real-time point cloud data with the reference point cloud map comprises:

determining the first coordinates of the data point in the real-time point cloud data does not match the reference point cloud map under a condition that the second grids do not comprise the static grid.

8. The method for identifying the data point according to claim 1, further comprising:

filtering data points in the real-time point cloud data larger than a preset range.

9. The method for identifying the data point according to claim 1, further comprising:

acquiring point cloud map data within a preset range centered on the current position, and updating the reference point cloud map according to the acquired point cloud map data.

10. An apparatus for identifying a data point, comprising:
a processor; and
a memory coupled to the processor, storing program instructions which, when executed by the processor, cause the processor to:

acquire real-time point cloud data of a current position of a vehicle by a lidar scanning device on the vehicle;

convert a coordinate of a data point in the real-time point cloud data into a first coordinate under a coordinate system of a preset reference point cloud map, wherein the reference point cloud map comprises static data points;

match the first coordinate of the data point in the real-time point cloud data with the reference point cloud map, comprising:

build a KD-tree according to a coordinate of each data point in the reference point cloud map;

search in the KD-tree to determine whether there exists a second coordinate identical to the first coordinate of the data point in the real-time point cloud data;

determine the first coordinate of the data point in the real-time point cloud data matches the reference point cloud map under a condition that there exists the second coordinate;

determine whether there exists a third coordinate identical to an adjacent coordinate of the first coordinate of the data point in the real-time point cloud data under a condition that there does not exist the second coordinate;

determine the first coordinate of the data point in the real-time point cloud data matches the reference point cloud map under a condition that there exists the third coordinate; and determine the data point in the real-time point cloud data as a dynamic data point under a condition that there does not exist the third coordinate; and determine the data point in the real-time point cloud data as a static data point under a condition that the first coordinate of the data point in the real-time point cloud data matches the reference point cloud map, to perform path planning for the vehicle according to the static data point and the dynamic data point.

11. A non-transitory computer-readable storage medium, which stores a computer program that, when executed by a processor, cause the processor to:

acquire real-time point cloud data of a current position of a vehicle by a lidar scanning device on the vehicle;

convert a coordinate of a data point in the real-time point cloud data into a first coordinate under a coordinate system of a preset reference point cloud map, wherein the reference point cloud map comprises static data points;

match the first coordinate of the data point in the real-time point cloud data with the reference point cloud map, comprising:

build a KD-tree according to a coordinate of each data point in the reference point cloud map;

search in the KD-tree to determine whether there exists a second coordinate identical to the first coordinate of the data point in the real-time point cloud data;

determine the first coordinate of the data point in the real-time point cloud data matches the reference point cloud map under a condition that there exists the second coordinate;

determine whether there exists a third coordinate identical to an adjacent coordinate of the first coordinate of the data point in the real-time point cloud data under a condition that there does not exist the second coordinate;

determine the first coordinate of the data point in the real-time point cloud data matches the reference point cloud map under a condition that there exists the third coordinate; and determine the data point in the real-time point cloud data as a dynamic data point under a condition that there does not exist the third coordinate; and determine the data point in the real-time point cloud data as a static data point under a condition that the first coordinate of the data point in the real-time point cloud data matches the reference point cloud map, to perform path planning for the vehicle according to the static data point and the dynamic data point.

\* \* \* \* \*